US006539381B1

United States Patent
Prasad et al.

(10) Patent No.: US 6,539,381 B1
(45) Date of Patent: Mar. 25, 2003

(54) SYSTEM AND METHOD FOR SYNCHRONIZING DATABASE INFORMATION

(75) Inventors: Ranjan Prasad, Freemont, CA (US); Layne C. Izatt, Orem, UT (US); Dale R. Olds, Sandy, UT (US)

(73) Assignee: Novell, Inc., Provo, UT (US)

( * ) Notice: Subject to any disclaimer, the term of this patent is extended or adjusted under 35 U.S.C. 154(b) by 0 days.

(21) Appl. No.: 09/296,687

(22) Filed: Apr. 21, 1999

(51) Int. Cl.$^7$ ............................................... G06F 17/30
(52) U.S. Cl. ........................ 707/10; 707/203; 707/200
(58) Field of Search .................. 707/8–10, 1, 200–205; 709/316

(56) References Cited

U.S. PATENT DOCUMENTS

| | | | |
|---|---|---|---|
| 5,596,574 A | | 1/1997 | Perlman et al. ............. 370/389 |
| 5,765,171 A | * | 6/1998 | Gehani et al. .............. 707/203 |
| 5,787,247 A | * | 7/1998 | Norin et al. ................ 709/220 |
| 5,832,487 A | * | 11/1998 | Olds et al. .................... 707/10 |
| 6,021,118 A | * | 2/2000 | Houck et al. ............... 370/254 |
| 6,065,017 A | * | 5/2000 | Barker ........................ 707/202 |
| 6,098,078 A | * | 8/2000 | Gehani et al. .............. 707/203 |
| 6,233,623 B1 | * | 5/2001 | Jeffords et al. ............. 709/316 |

FOREIGN PATENT DOCUMENTS

EP 0702497 * 3/1996

OTHER PUBLICATIONS

Reed, E., LDUP Replication Information Model, http://search.jetf.org/internet–drafts/draft–reed–Idup–infomod–00.txt; Nov. 18, 1998, pp. 1–15.

* cited by examiner

Primary Examiner—Jean M. Corrielus
Assistant Examiner—Jean Bolte Fleurantin
(74) Attorney, Agent, or Firm—Dinsmore & Shohl LLP

(57) ABSTRACT

A system and method for synchronizing database information over a communications network distributed among a plurality of servers. The system allows each server to track the state of a replica on each of the servers, and changes to the servers are communicated between the servers along with their states. The states may be stored as an array of timestamps, the timestamps each indicating a time at which the replica on each server was updated. In a network wherein two servers (a first and third server) cannot communicate directly, a first network server transmits a change to an intermediate (a second) server including its state information. The second server transmits the change to the third server, and the third server updates its replica. The third server transmits its state information to the second server, and the timestamp information is conveyed to the first server. The state information of the third server may be transmitted to the second server during later updates of the third server's replica. The first server, by receiving the third server's state information, can determine that the change in replica information was performed on the third server. The synchronization system and method may be used to transmit changes, such as those involved in a partitioning operation.

18 Claims, 15 Drawing Sheets

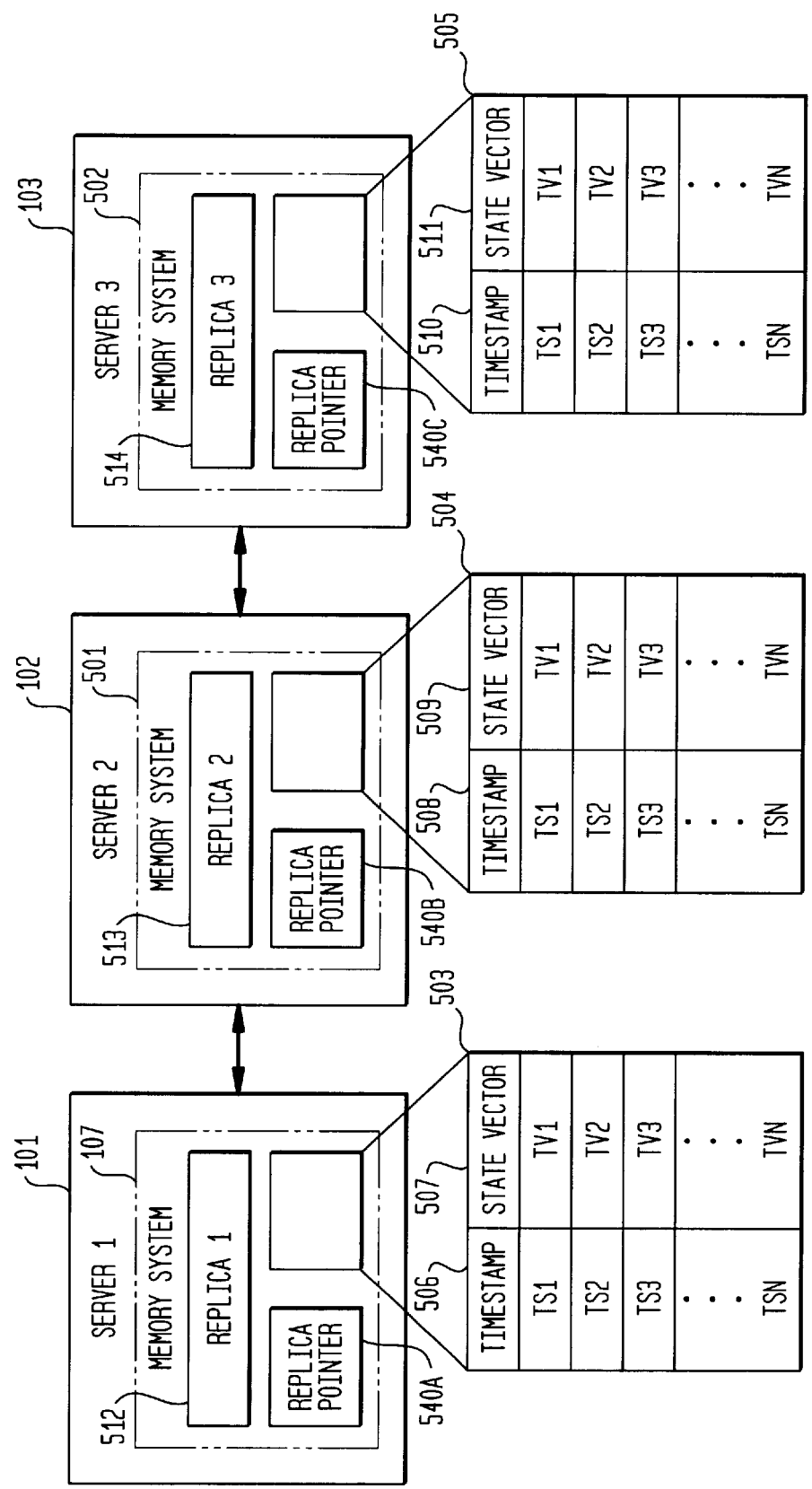

FIG. 5B

| TIME PERIOD | ACTION | SERVER 1 | SERVER 2 | SERVER 3 |
|---|---|---|---|---|
| 1 | BEGIN (ALL STATES OF SERVERS 1-3 RECOGNIZED BY EACH OTHER SERVER | TS1,TV1<br>TS2,TV2<br>TS3,TV3 | TS1,TV1<br>TS2,TV2<br>TS3,TV3 | TS1,TV1<br>TS2,TV2<br>TS3,TV3 |
| 2 | SERVER 1 MAKES A CHANGE TO REPLICA, UPDATES ITS TS1,TV1 | TS1',TV1' (WITH TS1')<br>TS2,TV2<br>TS3,TV3 | TS1,TV1<br>TS2,TV2<br>TS3,TV3 | TS1,TV1<br>TS2,TV2<br>TS3,TV3 |
| 3 | SERVER 1 SENDS TV1' WITH REPLICA CHANGES, S2 MERGES LOCAL COPY OF TV2 WITH RECEIVED TV1' | TS1',TV1' (WITH TS1')<br>TS2,TV2<br>TS3,TV3 | TS1',TV1'(WITH TS1')<br>TS2',TV2' (WITH TS1',TS2')<br>TS3,TV3 | TS1,TV1<br>TS2,TV2<br>TS3,TV3 |
| 4 | SERVER 2 SENDS TV1', TV2' WITH REPLICA CHANGES, S3 MERGES LOCAL COPY OF TV3 WITH RECEIVED TV2', TV1' | TS1',TV1' (WITH TS1')<br>TS2,TV2<br>TS3,TV3 | TS1',TV1'(WITH TS1')<br>TS2',TV2'(WITH TS1', TS2')<br>TS3,TV3 | TS1,TV1 (WITH TS1')<br>TS2',TV2' (WITH TS1', TS2')<br>TS3',TV3'(WITH TS1', TS2',AND TS3') |
| 5 | SERVER 3 SENDS TV3 WITH REPLICA CHANGES, S2 MERGES LOCAL COPY OF TV2' WITH TV3' | TS1',TV1' (WITH TS1')<br>TS2,TV2<br>TS3,TV3 | TS1',TV1'<br>TS2",TV2" (WITH TS1',TS2', AND TS3')<br>TS3',TV3' (WITH TS1',TS2', AND TS3') | TS1',TV1' (WITH TS1')<br>TS2',TV2'(WITH TS1', TS2')<br>TS3',TV3'(WITH TS1', TS2',AND TS3') |
| 6 | SERVER 2 SENDS TV2, TV3 WITH REPLICA CHANGES, S1 MERGES LOCAL COPY OF TV1, AND TV2", TV3' | TS1",TV1" (WITH TS1",TS2", AND TS3')<br>TS2",TV2"<br>TS3',TV3' | TS1',TV1'<br>TS2",TV2" (WITH TS1',TS2", AND TS3')<br>TS3',TV3' (WITH TS1',TS2', AND TS3') | TS1',TV1'<br>TS2',TV2'<br>TS3',TV3' (WITH TS1',TS2', AND TS3') |

SYSTEM AND METHOD FOR SYNCHRONIZING DATABASE INFORMATION

BACKGROUND OF THE INVENTION

1. Field of the Invention

The present invention relates generally to distributed databases and, more particularly, to synchronizing database information over a distributed communications network.

2. Related Art

As the use of computer networks grows, the use of distributed databases for storing data has become commonplace. Distributed databases are databases wherein one or more portions of the database are divided and/or replicated (copied) to different computer systems. These portions of the database are commonly referred to in the art as "partitions." The act of segmenting a database into partitions is commonly referred to as "partitioning." Partitions are generally distributed throughout a communication network among separate distributed systems to allow access to the database in a more efficient manner than can be achieved with a centralized database. Partitions may be made more easily accessible to users that access information within the particular partition to increase overall database performance. For example, partitions may be located geographically and/or logically closer to database users that use a particular partition.

Also, a distributed database system may include replicas, or copies of a database or database partition, which are located on different systems. The term "database replica" or "replica" will be used herein to refer generally to such replicas regardless of whether the replica contains an entire database or a partition thereof. The set of all database replicas for a partition are referred to as a replica set. By having multiple copies of the database, a database can be recovered if one system (and one copy) experiences problems. Also, distributed databases allow the data to be managed by multiple servers, thus increasing database throughput. However, there are drawbacks to conventional techniques to maintain distributed databases. One problem includes synchronizing database information among the distributed database or database partitions. If a database replica is unreachable, there will be no convergence in the database data among the partitions.

Convergence is generally experienced when each of the database replicas contains the same information. As users add information to the individual replicas, database convergence is critical; a user must know that the data upon which they are relying is current and agrees with the data of the other database replicas. In some distributed database systems, there is an N×N connectivity problem that impedes database convergence. In an N×N system, each system must be able to contact all other systems directly. For instance, each system having a database replica that can achieve a local database change must be able to contact all other replicas to provide those replicas with that change.

In a large database system, there are several reasons why connectivity between database servers cannot be guaranteed. There may be economic limitations to complete connectivity. Transmission of database information over expensive communications links may be cost-prohibitive. Further, there may be transport limitations. In particular, it may not be possible for all database servers to communicate in a same communication protocol across the network. In some situations, two or more computer systems may not be able to communicate at all. There may also be security limitations. With the advent of firewalls and secure networks, allowing such systems to communicate may not be desired. Lastly, some systems may not be available because of a network failure, disconnection from the communication network, or may not be operable or powered on during a time when synchronization is needed.

In addition to distributing database information, synchronization operations may need to be performed to complete certain operations, such as a partitioning operation. In one such partitioning operation, one system, referred to as the "master" or primary system, is designated as the master for a database partition (termed the "master replica") is responsible for controlling the partitioning operation. The master system generally stores the master replica in a memory system located on the master.

Typically, a database administrator will control the master to create or modify a partition. To propagate changes to the partition, the master typically requires contact with all systems that will participate in a partitioning operation before the partitioning operation can be completed. If one or more systems are not reachable by the master, convergence cannot be achieved. Also, in some database systems it may not be acceptable to relay changes at one point in time to one subset of systems and to relay the changes at a second point in time to a second subset of systems.

Recently, computer systems that provide directory services have become a common way for providing resource information to users. Typically, directory services are databases of resource information that can be accessed by users through a communications network. Novell Directory Services (NDS), for example, is a global directory service solution that provides globally distributed information regarding various network resources to various network systems (Novell Directory Services is a registered trademark of Novell, Incorporated). Such resources can include objects such as systems, users, applications, servers, etc., that users may access through the NDS directory service.

Because the NDS database is used to access all resources on the network, the entire network would be disabled if the database itself were stored on only one server (with all other servers accessing the database on that server) and that server were to become unavailable. To avoid single point failures, distributed NDS databases are typically implemented. In this distributed database, replicas of the database are created and those replicas are stored on different servers. Then, if one server malfunctions, all other servers can continue to access the NDS database from another database replica.

If the NDS database is too large, a network administrator may not want to store the entire database on multiple servers. In this case, the network administrator may create directory partitions. The partitions may also include subpartitions ("child partitions") beneath them. Using partitions can improve network performance, especially if the network expands across low bandwidth links, such as in a wide area network (WAN). Partitions also make it easier for a network administrator to separately manage portions of the database.

The NDS directory service is based on a standard referred to as the X.500 directory services standard, which defines a directory services protocol. Lightweight Directory Access Protocol (LDAP) is another type of directory services database standard which is commonly used to communicate and store resource information over the Internet. Because directory services databases may benefit from replicas and partitioning, they may also suffer from the aforementioned synchronization problems. These problems may cause other problems for systems that rely upon directory services information.

SUMMARY OF THE INVENTION

The present invention overcomes these and other drawbacks of conventional systems by providing a system and method for synchronizing distributed databases that does not require connectivity between all database replicas. The present invention enables each server to track the state of each replica of a replica set. Changes to the replicas are then communicated between the servers along with their states. The states may be stored as an array of timestamps, each such timestamp indicating a time at which the replica on each server was last updated. In one embodiment, the timestamp may be a unique identifier for identifying a replica change performed on a particular replica.

In a network wherein two servers (a first and a third server) cannot communicate directly, the first network server transmits a replica change to an intermediate (second) server including state information of the first network server, the second server transmits the change to the third server, and the third server updates its replica. The third server transmits its state information to the second server, and the state information is transmitted to the first server. Thus, the first server, by receiving and inspecting the third server's state information, can determine that the change in replica information was performed on the third server.

In one aspect of the present invention, a system is provided for synchronizing replicas of a distributed database among a plurality of servers. The system includes means for storing, at a first server, a plurality of timestamps identifying a state of a plurality of replicas each located on one of the plurality of servers. Further, the system include means, responsive to a change in a local replica at the first server, for transmitting the replica change to a second server, wherein transmission of the change is responsive to a timestamp of the replica of the first server and a time stamp of the replica of the second server. The system further includes means for updating, at the second server, the replica of the second server to reflect the change and means for storing, at the second server, a new timestamp indicating a time at which the replica of the second server was last updated.

In another aspect, a method for synchronizing replicas of a distributed database is provided. The replicas forming a replica set, wherein each replica of the replica set is stored on one of a plurality of servers in a network. The method comprises steps of storing, at a first server, a plurality of timestamps associated with a plurality of replicas located on each of the plurality of servers responsive to a change in a local replica at the first server, the change is transmitted to a second server, wherein transmission of the change depends upon a comparison of a timestamp of the replica of the first server and a timestamp of the replica of the second server. The method further comprises a step of updating, at the second server, the replica of the second server to reflect the change. The method further comprises a step of storing, at the second server, a new timestamp indicating a time at which the replica of the second server was last updated.

In another embodiment, the method further comprises steps of, responsive to the change in the replica of the second server, transmitting the change to a third server, updating, at the third server, the replica of the third server to reflect the change and notifying the first server that the replica of the third server is updated to reflect the change. In another embodiment, the change is initiated by a user on the replica of the first server. In another embodiment, the change is initiated by an update received from another server.

In yet another embodiment, the first server stores the plurality of timestamps as a single value. In another embodiment, the method further comprises a step of storing, at the second server, a plurality of timestamps associated with the plurality of replicas, wherein transmitting the change to the third server depends upon a comparison of the new timestamp of the replica of the second server and a timestamp of the replica of the third server.

In another embodiment, the method includes storing a plurality of timestamps comprises storing the timestamps as a first array of timestamps. In another embodiment, the method further comprises transmitting the first array of timestamps to the second server. In another embodiment, the method further comprises storing timestamps on the second server in a second array and merging the first array with the second.

In another embodiment, the step of notifying includes determining at the first server, a timestamp associated with the third replica received from the second server, the timestamp from the second server indicating that the third server has incorporated the change.

In still a further aspect of the present invention, a computer program product is disclosed. The product comprises a computer readable medium having computer program logic recorded thereon for enabling a processor in a computer system to synchronize replicas of a distributed database. The computer program product is adapted to cause the computer system to perform the steps of storing, at a first server, a plurality of timestamps associated with a plurality of replicas located on each of the plurality of servers, responsive to a change in a local replica at the first server, transmitting said change to a second server, wherein transmission of the change depends upon a comparison of a timestamp of the replica of the first server and a timestamp of the replica of the second server, and updating, at the second server, the replica of the second server to reflect the change. The computer system performs a step of storing, at the second server, a new timestamp indicating a time at which the replica of the second server was last updated.

In another embodiment, the computer system performs the steps of, responsive to the change in the replica of the second server, transmitting the change to a third server, updating, at the third server, the replica of the third server to reflect the change and notifying the first server that the replica of the third server is updated to reflect the change. In another embodiment, the change is initiated by a user on the replica of the first server. In another embodiment, the change is initiated by an update received from another server.

In yet another embodiment, the first server stores the plurality of timestamps as a single value. In another aspect, the computer system performs a step of storing, at the second server, a plurality of timestamps associated with the plurality of replicas, wherein transmitting the change to the third server depends upon a comparison of the new timestamp of the replica of the second server and a timestamp of the replica of the third server.

In another embodiment, the computer system performs a step of storing a plurality of timestamps comprises storing the timestamps as a first array of timestamps. In another embodiment, the computer system performs a step of transmitting the first array of timestamps to the second server. In another embodiment, the computer system performs a step of storing timestamps on the second server in a second array and merging the first array with the second.

In another embodiment, the step of notifying includes determining at the first server, a timestamp associated with the third replica received from the second server, the timestamp from the second server indicating that the third server has incorporated the change.

In another aspect, an apparatus is provided for synchronizing a distributed database. The apparatus comprises a processor and a memory system configured to store a state of a first copy of a database. The apparatus further comprises a synchronization system configured to transmit a change in the first copy of the database and the state of the first database to an intermediate entity having a second copy of the database. The synchronization system is responsive to a message transmitted from the intermediate entity, the message indicating that the change has been incorporated in a third copy of the database by a third entity.

Advantageously, the present invention does not require communication between each of the servers to provide for convergence of the distributed database. Further, the aforementioned synchronization system and method may be used to perform changes to the database system such as during a partitioning operation. Because other servers participate in transferring changes to other servers, burden on the master server to perform partitioning operations is reduced. Such operations may include merging, deleting, creating, and editing partitions.

Further features and advantages of the present invention as well as the structure and operation of various embodiments of the present invention are described in detail below with reference to the accompanying drawings. In the drawings, like reference numerals indicate like or functionally similar elements. Additionally, the left-most one or two digits of a reference numeral identifies the drawing in which the reference numeral first appears.

BRIEF DESCRIPTION OF THE DRAWINGS

This invention is pointed out with particularity in the appended claims. The above and further advantages of this invention may be better understood by referring to the following description when taken in conjunction with the accompanying drawings in which similar reference numbers indicate the same or similar elements.

FIG. 5A is a block diagram showing communication between three servers according to one embodiment of the present invention.

FIG. 5B is a chart showing an example synchronization according to one embodiment of the present invention.

DETAILED DESCRIPTION

Figure 1:
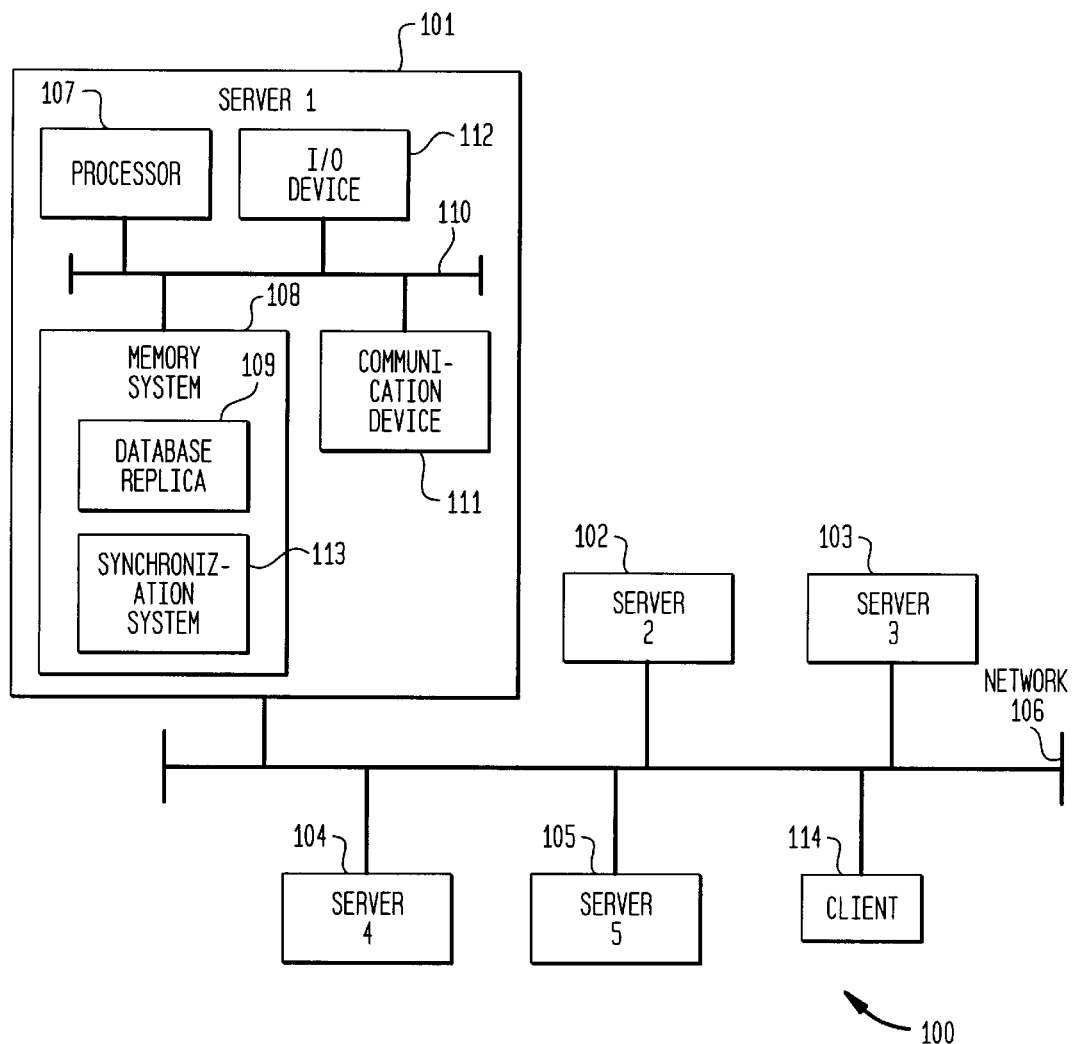
FIG. 1 is an exemplary network system wherein the database synchronization system of the present invention may be implemented.

An exemplary network system wherein the database synchronization system of the present invention may be implemented is illustrated in FIG. 1. The exemplary network system 100 includes a plurality of servers 101–105 interconnected through network 106. Network 106 may be, for example, a local area network (LAN), metropolitan area network (MAN), wide area network (WAN), etc., or other network used to communicate information between systems. Network 106 may also include one or more clients 114 that may use one or more server resources. Typically, client and servers are computers but may be any type of device that includes a network interface and may benefit from or provide resources to another system. Network 106 may contain any combination of client and server systems.

An exemplary computer system implementing the synchronization system 113 of the present invention is shown in FIG. 1 as server 1 (item 101). Computer system 101 may be a general purpose computer system, which typically includes a processor 107 connected to a memory system 108 via an interconnection mechanism such as a computer bus 110. Input/output (I/O) devices 112 such as disk controllers, graphics cards, or the like may be included in computer system 101. The computer is capable of executing an operating system and is generally programmable by using a high level computer programming language such as the C++ programming language.

Server node 101 includes a replica 109 of a distributed database stored in memory system 108, referred to as database replica 109. Replicas of the distributed database may be stored in one or more of the servers in network 100, such as servers 2, 3, 4, and 5 (items 102, 103, 104 and 105 respectively, of FIG. 1). As will be described in more detail below, synchronization system 113 synchronizes a first database replica 109 with database replicas of one or more of servers 102–105. Servers 102–105 generally include a similar synchronization system such that servers 102–105 are also capable of synchronizing changes to other database replicas in accordance with the present invention as described below.

The general purpose computer system 101 preferably includes a commercially available processor 107, such as the Pentium, Pentium II or Pentium III microprocessor from Intel Corporation, PowerPC microprocessor, SPARC processor, PA-RISC processor or 68000 Series microprocessor from Motorola. Many other processors are also available. Such a processor generally includes an operating system which may be, for example, DOS, Windows 95, Windows 98, Windows NT, or Windows 2000 operating systems from the Microsoft Corporation, the System 7.X operating systems from Apple Computer, the Solaris operating system from Sun Microsystems, the Unix operating system and its variants available from many vendors including Sun Microsystems, Inc., Hewlett Packard, Red Hat Computing and AT&T, or the NetWare or IntraNetWare operating systems available from Novell, Inc.

The operating system controls the execution of other computer programs and provides scheduling, debugging, input/output control, accounting, computation, storage assignment, data management, memory management, communication control and related services. Processor 107 and an operating system defined a computer platform for which application programs and high-level programming languages are written. Server systems 101–105 and clients 114 may be any type of computer system as described above, with a network interface card (NIC) or other communication device to communicate over network 106.

The operating system interfaces with firmware and hardware of system 101 in a well-known manner to access I/O devices 112 and memory system 108. Memory system 108 may be any commonly available random access memory (RAM) or read-only memory (ROM), a hard drive, CD ROM, tape system, or the like used to store and/or retrieve data.

The synchronization system 113 of the present invention is preferably implemented in C++, however, it may be implemented in any other well-known software language. For example, the synchronization system 113 may be implemented and interpreted in an object-orientated programming language, such as JAVA, ActiveX, or SmallTalk. System 113 may also be configured to execute within a browser application, such as the Netscape Navigator browser available from Netscape, Inc. or the Microsoft Internet Explorer browser available from Microsoft. Furthermore, the synchronization system 113 is capable of residing on any well-known computing platform.

Software techniques for performing synchronization functions in accordance with the present invention typically reside in memory 108 and may be stored on a computer-readable medium such as, for example, magnetic disk, compact disk, magnetic tape, or optical media. A software embodiment of the present invention may be, for example, loaded into computer system 101 using an appropriate peripheral device as known in the art. Alternatively, software implementing another embodiment of the present invention may be stored, for example, on a server located in network 106, and installed or executed over network 106.

It should be understood, however, that the present invention is not limited to a particular computer platform, particular operating system, or particular processor. The exemplary environments identified above are given by way of example only; the invention may be implemented in a variety of computer systems having a variety of system architectures.

According to one embodiment of the invention, a synchronization system is provided that transmits a replica change and a state of a first replica stored on a first server to an intermediate server. The intermediate server transmits the replica change and state to a third server, and the first sever receives, through the intermediate server, a recorded state of the first server replica at the third server. Because a recorded state of the first server is transmitted by the third server through an intermediate server back to the first server, the first server can determine that the change in state was recorded by the third server. Thus, the first server can determine that the replica change was effected on the third server without having to communicate directly with the third server.

In one embodiment of the invention, the synchronization system may be used to synchronize a directory services database. In a network configuration such as network 106, a number of clients are typically coupled via one or more networks to a server and resources such as applications, files, databases, and printers are shared by nodes in the system. Resources may be distributed among different devices in the network or stored in a central database. Access to network resources may be controlled by creating an object for each resource and controlling access to that object. An object includes properties or attributes in the values of data corresponding to those properties. In the exemplary network 106, database replica 109 is a database of network objects that represent resources in network 106.

In one embodiment, distributed database 109 is the Novell Directory Services (NDS) database by Novell, Inc. (where Novell Directory Services is a registered trademark of Novell, Inc.). The NDS database is a global directory containing information about objects in network 106. The NDS database is globally distributed to multiple servers to provide access to network resources, regardless of where they are located. Novell Directory Service databases are described in more detail in *The Complete Guide to Novell Directory Services,* by David Kearns and Brian Iverson, SYBEX Inc., 1998, herein incorporated by reference in its entirety. For ease of discussion, the distributed database and database replica 109 are referred to interchangeably and should be considered to be equivalent for the purposes of the present invention, unless the context indicates otherwise.

Figure 2:
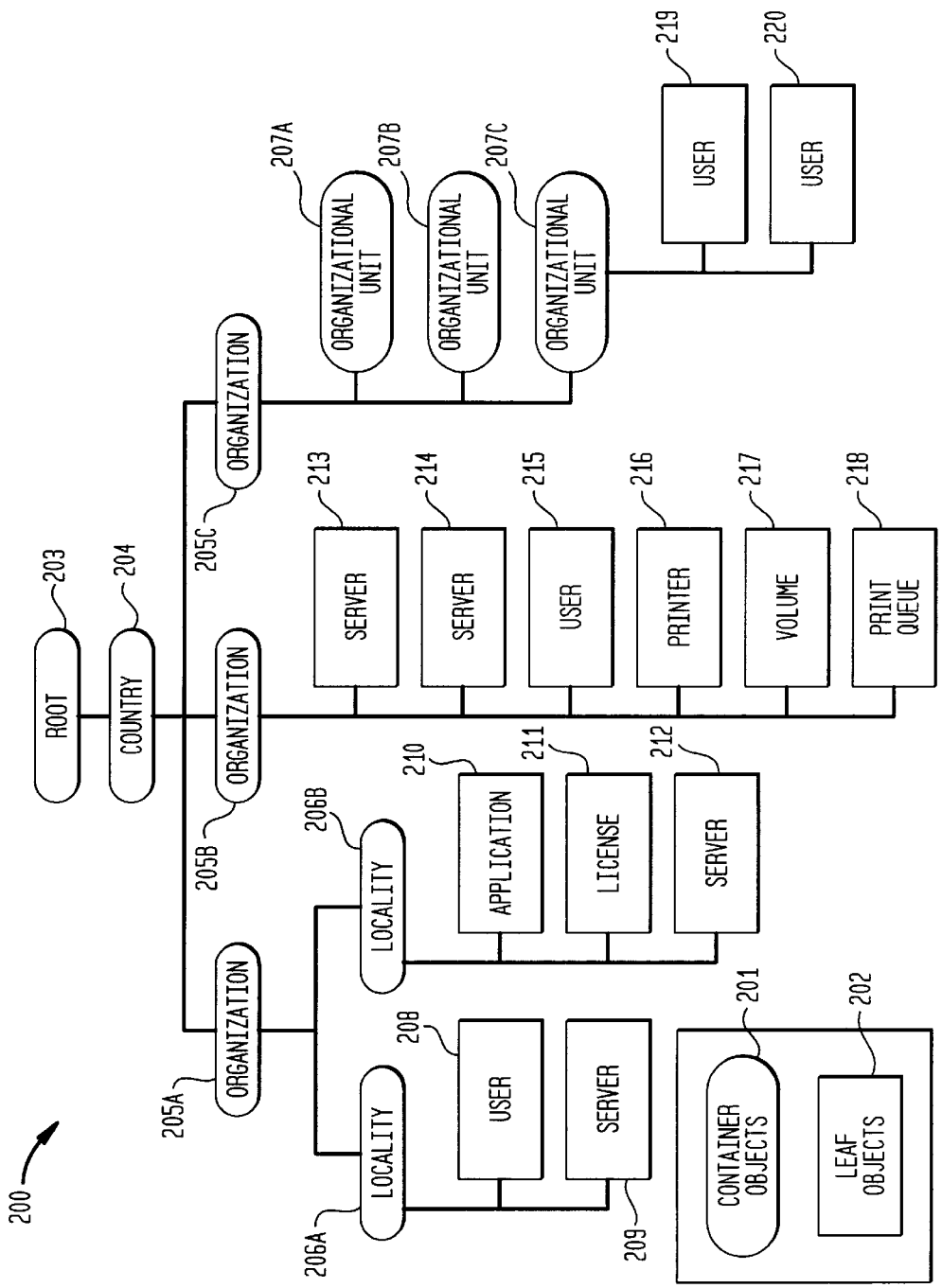
FIG. 2 is a block diagram of an exemplary database structure that can be operated upon by the present invention.

FIG. 2 is a block diagram illustrating the hierarchical structure of distributed database 113. As noted in the illustrative NDS database, the resources are referred to as objects and are organized in a hierarchial directory tree. For example, objects of the directory tree could include printers, users, servers, applications, and the like. This hierarchial arrangement enables network managers to easily manage the network.

The object of hierarchy 200 includes a number of container objects 201 and a number of leaf objects 202. Container or parent objects 201 can contain other objects, including other container objects 201 or leaf objects 202. Leaf or child objects 202 represent specific network resources; leaf objects 202 do not contain other objects. Container objects 201 may be created to accommodate any organizational arrangement. For example, a network administer may create folder objects representing sites, buildings, groups, or other meaningful organizational units. The user can then place an object representing a specific network entity in a particular folder object to identify the network entity.

Referring to the illustrative hierarchial arrangement shown in FIG. 2, a root object 203 is a container object representing a global directory of resources and network 100. Accordingly, the root object 203 is located at the top of the object hierarchy. Root object 203 contains other container objects, including a country object 204. Within the country object 204 there are multiple organizational objects 205A–205C, which are themselves container objects. Further, root object 203 may contain one or more leaf objects 202. Further, a server may contain more than one database of objects.

Leaf objects 202 include representations of network entities in network 100. For example, leaf objects 213, 214, 209, and 212 represent servers located in network 100. Other network entities such as users, printers, disk volumes, workstations, applications, licenses, etc. may be represented by leaf objects as shown by leaf objects 208–220. As is well-known in the art, leaf objects 202 are generally managed by a network administrator using a well-known network management program such as the NDS Manager or NW Admin programs available from Novell, Inc.

As noted, each of the objects in database 109 has properties or attributes. The object and its properties are broken down into segments that are stored into different data records and the distributed database 109. Each of the data records stores the same number of bytes with logical elements stored in multiple data records. Accordingly, there are different record types. In one embodiment, there are records which contain object information, referred to as object records; records that contain property attributes, referred to as property records; records that contain information related to the association of partitions and replicas, referred to as partition records, etc. Also, objects may be stored as a "blob," or raw piece of data, for faster retrieval and storage.

Figure 3:
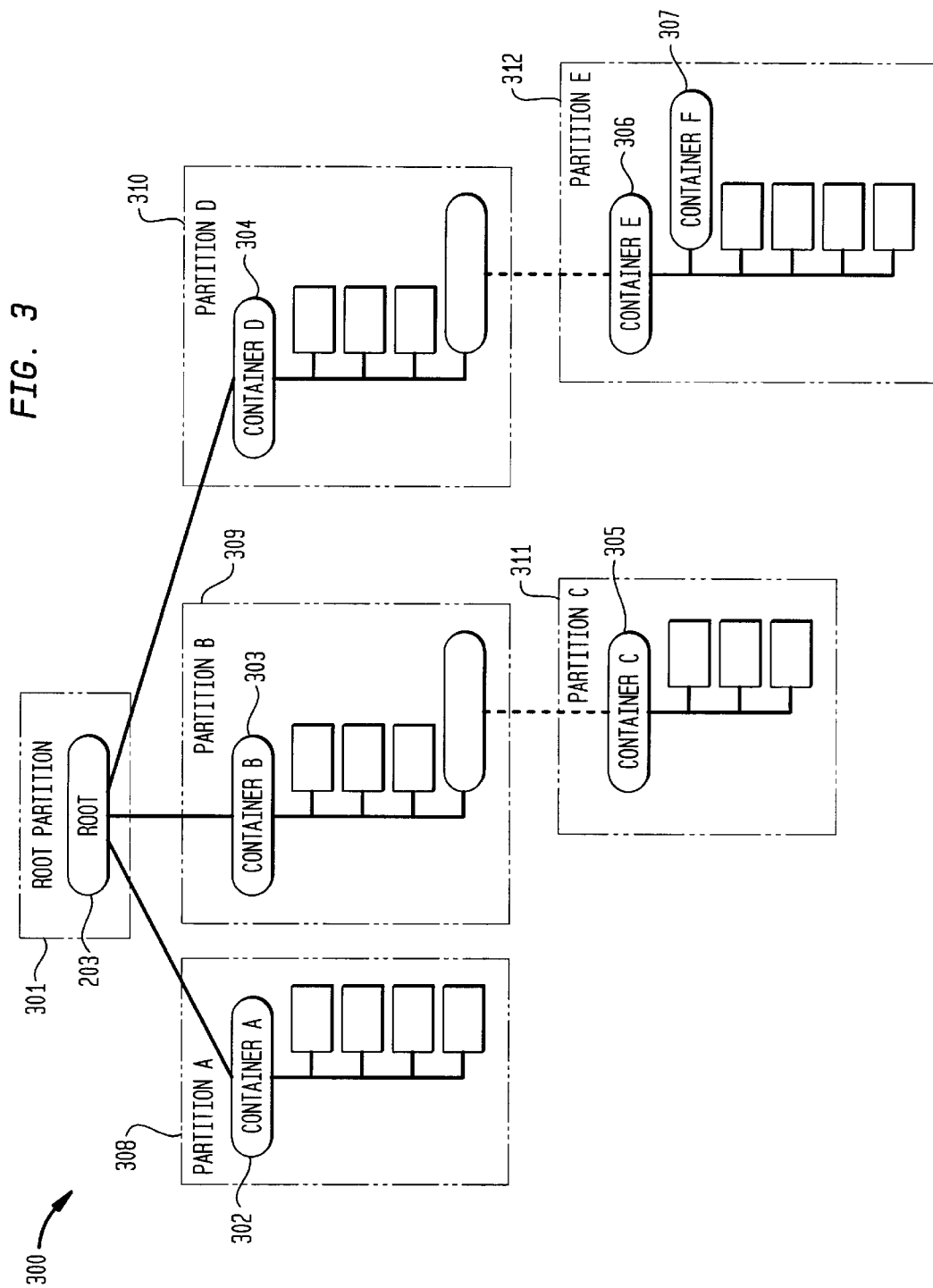
FIG. 3 is a block diagram showing partitions of a database structure.

As discussed above, database 109 may be partitioned into different portions or partitions. Referring to FIG. 3, root partition 301 includes root object 203 and references to container A, container B, and container D (items 302–304). These references are referred to as pointers and simply refer to (or point to) another partition that holds the actual objects.

Partitions may be subordinate to other partitions. Partitions that are subordinate to or are "contained" by other partitions are referred to as child partitions. Partitions that contain other partitions are referred to as parent partitions. In NDS, if a parent partitions is stored on a server that does not store a copy of its child partition, an entity called a subordinate reference is created. A subordinate reference is a reference (or pointer) to a topmost container object of the child partition, and includes location information for the child partition's replicas.

A network administrator may create multiple partitions, such as partition A (item 308) which includes container A (item 302) and all of the leaf elements and container objects contained therein. Partition B (item 309) includes container B (item 303) and all of the leaf and container objects contained within it. Container B 303 includes container C (item 305) which is the basis of another partition, partition C (item 311). Partition C (item 311) includes container C (item 305) and all of the objects contained within it. Further, there may be a partition D (item 310) that includes container D (item 304) which includes leaf and container objects contained within it. Container D (item 304) includes container E (item 306A) which includes leaf elements and/or container elements, such as a container F (item 307). Such a configuration of database 300 is conducive for implementing the system and method of the present invention.

Figure 4:
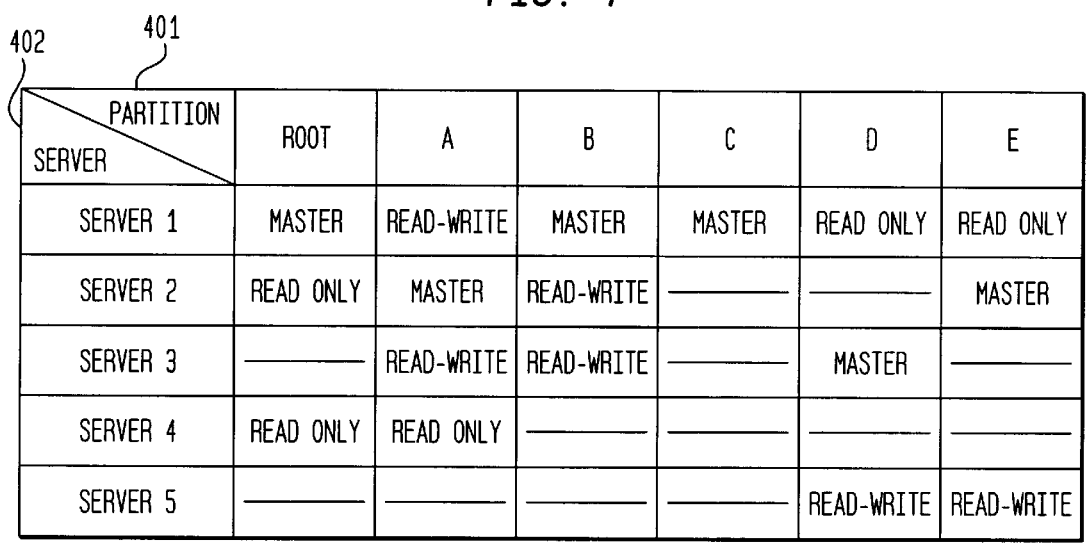
FIG. 4 is a chart showing one example of partition and replica configuration among a group of database servers.

FIG. 4 shows a chart of an exemplary partition and replica configuration among a group of database servers. For instance, in FIG. 3, partitions A through E and the root partition may be located on a number of different servers, such as servers 1–5 of FIG. 1 (items 101–105, respectively). In FIG. 4, each row indicates a function which a server 402 performs with respect to a partition. In particular, a server may include a replica of database 109 or a partition thereof. Also, a server may hold replicas of multiple partitions. In the examples of FIGS. 3 and 4, server 1 stores six different partitions in its memory system. These partitions include the root partition, and partitions A–E (items 301, 308–312, respectively).

Servers may perform a particular role with respect to database 109. In the NDS system, there are four types of replicas: master, read-write, read-only, and the subordinate reference replicas. For example, a replica on a server can be designated by a network administrator as a master replica as server 1 is for the root, B and C partitions. In the NDS system, the master replica is the only replica that can make changes to the directory partition, such as adding, merging, or deleting replicas. Also, clients can create, modify, and delete objects. In NDS, there is only one master replica per partition.

A server may host a read-write replica. A read-write replica is a replica in which clients can create, modify, and delete entries. In NDS databases, read-write replicas may accept requests to modify NDS objects. Any number of read-write replicas may exist on a network. A read-only replica is a replica in which information can be read, but not modified. Any number of read-only replicas may exist on a network.

A subordinate reference is a reference to a subordinate partition. However, because only the attributes of topmost container are stored in the subordinate reference, a subordinate reference is sometimes not referred to as a replica. In NDS, a subordinate reference replica exists on a server if that server holds a replica of a parent partition, but does not hold a replica of the child partition. The subordinate reference replica provides information relating to the objects in the real child partition, such as location information. Subordinate reference replicas may be automatically created by a database management utility, such as in the NDS system.

Generally, a partition is positioned in the network 106 such that the partition is local to clients that most frequently access data in that partition. Further, usually two or three replicas of each partition are placed on separate servers. The amount of synchronization traffic occurs on the network is proportional to the number of replicas. In NDS, a well-known utility called NDS Manager is used to create, delete, merge, or repair partitions and replicas (NDS Manager is a registered trademark of Novell, Inc.). Partition Manager, available from Novell, Inc., is another well-known utility used to perform operations with partitions.

A network administrator generally works with replicas and partitions through an interface of the NDS Manager utility. If problems occur with directory partitions and replicas, an administrator may also use the NDS Manager utility to analyze the partitions and replicas and repair them if necessary. In particular, the NDS Manager utility automatically executes another well-known utility referred to as DSRepair. As discussed, the NDS Manager is used to perform operations relative to partitions and replicas. The NDS Manager and DSRepair are described in more detail in the reference *NetWare 5 Administrator's Handbook* by Kelly J. P. Lindberg, Novell Press, 1999, herein incorporated by reference in its entirety.

As shown in FIG. 4, a network administrator may wish to provide backup for a partition of a database 109. For example, a network administrator may wish to create a master replica of partition B on server 1, a secondary replica (a read-write) of partition B on server 2, and a secondary replica of partition B on server 3. The set of all replicas for a partition are referred to as a replica set. A replica set is, for example, a column of FIG. 4. In particular, with reference to partition B (column B), the replica set includes a master replica on server 1, and two secondary replicas on servers 2 and 3. Typically, replicas are assigned replica numbers and are identified by these numbers. These replicas for partition B are stored in memory on servers 1–3. As shown in FIG. 5A, server 1 (item 101) includes replica 1 stored in memory system 107. Further, replica 2 (item 513) is stored in memory system 501 of server 2 (item 102). Replica 3 (item 514) is stored in memory system 502 of server 3 (item 103). A replica set, as shown in FIG. 5A, may include replicas 1–3 (items 512–514).

Also in FIG. 5A, a data structure such as a table is stored at each of the servers 101–103 which includes the perceived states of each of the replicas on servers 101–103 at a given point in time. In one embodiment, server 101 includes a table 503 that includes timestamp 506 and state vector 507 information for each of the replicas in the replica set. A timestamp, described in more detail below with reference to FIG. 5D, is an identifier that indicates when a particular replica has been updated. In one embodiment, there is one timestamp for each unique replica in the replica set.

Further, state vector 507 is stored in memory system 107 which is associated with a replica in a server located on a replica set. The state vector signifies the synchronized state of the replica and the perceived states of other replicas. These perceived states are states recorded by a server when state vectors are received from other servers. Thus, other servers provide server 1 with their state vectors, and server 1 stores these vectors in its memory system. These "perceived" states are states of each replica from the perspectives of the other servers at a time that a state vector is sent.

In one embodiment, a state vector includes a unique identifier associated with a particular change on a particular server. By communicating the state vector to other servers, and by receiving the state vector from other servers, server 107 can determine if other servers had received replica changes.

State vector 507 may include a plurality of timestamps that represent the state of each replica. Thus, if there are N replicas, the state vector 507 will contain N timestamps. In one embodiment of the invention, there are the same number of timestamps as replica numbers. According to another embodiment, state vectors are stored on each server to record states perceived by other servers in network 106. In another embodiment, the vector is stored as a single value in memory system 107. It should be understood that other implementations are also possible.

As discussed, table 503 may include a plurality of timestamps and state vectors. For each replica in the replica set, there is one replica state vector stored. Thus, if there are N replicas in replica set, there would be N members in this set. In one embodiment, there is one row for each replica. In another embodiment, there is a row for each replica that is currently receiving updates, or "active" replica. For example, row 1 of table 503 corresponds to a timestamp and state vector for replica 1 (item 512) located on server 1 (item 101). The remainder of the rows of table 503 are for storing state information of replicas located on remote servers. Thus, it is noted that each server has one row that it "owns," or in other words, the one row corresponds to the replica it hosts and the rest of the rows are used to store perceived states of remote servers.

For example, in FIG. 5A, row 2 of table 503 corresponds to a timestamp and state vector for replica 2 (item 513) located on server 2 (item 102). However, row 2 of table 503 stores information of what server 2 had last communicated to server 1 regarding its knowledge of the states of other replicas. Thus, values for row 2 of table 503 and row 2 of table 504 may be different because server 2 may have a more recent state vector (TV2) than server 1's version of (TV2).

Similarly, server 2 (item 102) stores a table 504 similar to table 503. Also, server 3 (item 103) stores a table 505 that contains similar information to table 503. Each server will maintain, in memory, state information for each replica of a replica set.

It should be understood that any storage structure may be used to store timestamp and state vector information such as a table, a linked-list, stack, or the like. Tables are referred to herein for ease of description and should not be considered limiting.

The following relations hold true for replica sets according to various embodiments of the invention:

1. For any given TVi (state vector), wherein i is the server number (server 1, for example), TSi (timestamp) is equal to a timestamp corresponding to the ith entry in the TVi vector (the ith entry is specified by the replica number of the replica hosted by the ith server). In other words, on server 1, TS1 is equal to the timestamp entry for server 1 within the TV1 vector.

In one embodiment of the invention, read-only and subordinate reference replicas do not have a replica number assigned to them. An advantage of not assigning replica numbers to these types of replicas is that the number of read-only and subordinate replicas do not issue their own timestamps. Therefore, these types of replicas will not have control of their own tables; their time stamps will be adjusted by read-write or master servers. Thus, the length of the time vector and the number of timestamps to be tracked by the synchronization system is minimized. As a result, network traffic due to synchronization messages is minimized.

2. For any server i, its local copy of TSi will be greater than or equal to the value of TSi on any other server. That is, a stored state of server i stored on server i is the most recent state of server i and will be greater than or equal to the recorded state of server i at other servers. This relation holds true because, according to one embodiment of the invention, only the ith server can update its value of TSi. This relation is significant because server i can determine, by inspecting the values of TSi in state vectors of other servers, whether to send a change to other servers. If the value of TSi is the same for server j, server i does not need to send an update to server j.

In yet another embodiment, there may be an exception for read-only replicas and subordinate reference replicas that allow other read-write or master servers to update TSi. This exception allows other servers to control states stored on read-only and subordinate reference replicas that do not allow local updates of their replicas.

FIG. 5B shows an example of a synchronization process according to one embodiment of the present invention. In particular, FIG. 5B demonstrates a synchronization of replicas stored on three servers, servers 1–3 (items 101–103 of FIG. 5A). At time period 1, all states of servers are at the same state. That is, the states of all other servers are the same at each server 1–3. For example, the value of TS1 and TV1 on server 1 is the same as the value of TS1 and TV1 recorded on servers 2 and 3. It should be understood that servers 1–3 (items 101–103) are depicted as being at a same state for clarity of discussion only. Serves 101–103 may have different recorded states before staring a synchronization process.

At time period 2, the synchronization system of server 1 makes a change to its replica (replica 1) and updates its value of TS1 to TS1'. This change is typically caused by a client request to change information in replica 1. Similarly, the synchronization system 113 of server 1 (101) revises state vector TV1 to include the new value of TS1, resulting in a new state vector TV1'. This new state vector TV1' is sent to server 2 along with the database changes. The database changes may be incorporated in replica 2 (item 513) at server 2.

At time period 3, the synchronization system of server 2 merges its local copy of the TV2 vector with TV1'. The process of updating a vector with information from another vector is referred to as merging, and is described in more detail below with reference to FIG. 8. That is, the updated TS1 (TS1') is stored in server 2's copy of TV2 along with a new timestamp for replica 2 (TS2'), making the new state vector TV2'. A new TS2' is stored in state vector TV2 because changes are performed on the replica of server 2.

At time period 4, the synchronization system of server 2 sends TV1' and TV2' to server 3 with database changes made at server 1 and server 2, and the synchronization system of server 3 merges its local copy of TV3 with received TV2' and TV1'. That is, the value of TS1', TS2", and TS3' are stored in TV3, making a new state vector TV3'. TS3' is stored in state vector TV3 because changes are performed on the replica of server 3.

At time period 5, the synchronization system of server 3 sends TV3' with database changes and the synchronization system of server 2 merges its local copy of TV2' with TV3'. This merge results in a new TV2" being stored on server 2, including TS1', TS2", and TS3'.

At time period 6, the synchronization system of server 2 sends TV2", TV3' with database changes to the synchronization system of server 1, and the synchronization system of server 1 merges the local copy of TV1' with TV2' and TV3'. This merge may be performed by first merging TV2" and TV3', and merging TV' with the result of the first merging operation. However, the synchronization system of server 1 notes that the value of the time stamp of server 1 in the received state vector TV3' is equal to TS1'. Thus, the synchronization system of server 1 acknowledges that server 1 made the database change that was originally communicated by the synchronization system of server 1 at time period 3.

Figure 5C:
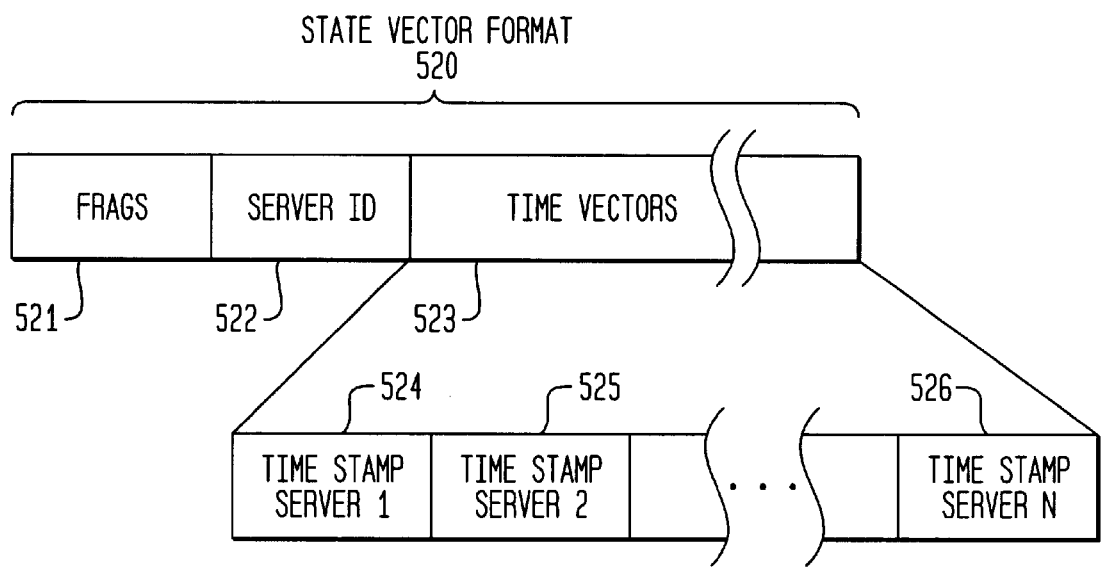
FIG. 5C is a block diagram depicting a format of a state vector in accordance with one embodiment of the present invention.
Figure 5D:
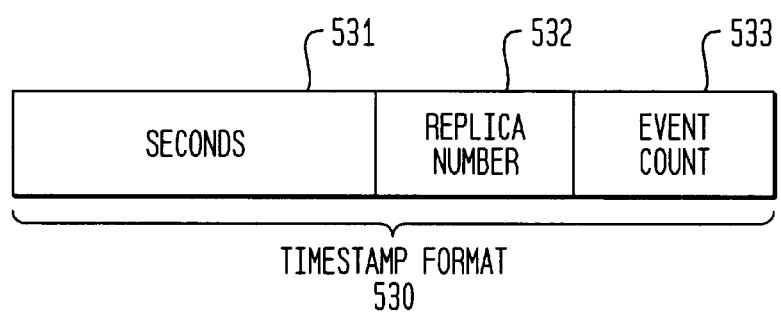
FIG. 5D is a block diagram depicting a format of a timestamp in accordance with one embodiment of the present invention.

In FIG. 5C, an exemplary format of a state vector 520 is shown. Flags 521 may be used to provide replica-specific information for an associated replica. For example, the flags 521 may include a flag 521A for specifying that the parent partition is local to the server having the replica. Server ID 522 contains the ID of the server (the server ID) storing the replica. In one embodiment, time vector 523 is information which includes a plurality of timestamps for all of the servers having read-write replicas. For example, time vector 523 may include a timestamp for server 1 (item 524), a timestamp for server 2 (item 525) and additional timestamps up to the number of replicas in the replica set.

In FIG. 5D, a timestamp format 530 is shown. The format may include seconds 531 which may be a count of seconds since a particular reference date. For example, seconds may be a four-byte value which is the count of the seconds elapsed since Jan. 1, 1970. It should be understood that a current time on a server may be relative time based on the time of another server, or may be an absolute time obtained from a mutually recognized time source, such as the United States Naval Observatory (USNO).

Further, servers participating in a network may include a mechanism for synchronizing time, such as a time server. The count of seconds may be determined for a particular time zone agreed upon by the servers. In one embodiment, timestamps are determined from Universal Time Coordinated (UTC) which refers to the time at the prime meridian (longitude 0'0") which passes through Greenwich, England. All time zones are calculated as plus or minus 1 to 12 hours from UTC time.

Also, the format of timestamp 530 may include replica 532 which is a unique number identifying replica in a replica set. Replica number 532 may be, for example, a two-byte value. Event count 533 is a counter that, when considered with the value seconds 531, makes multiple timestamps unique, and may be also a two-byte value. Therefore, timestamp 530 is a unique time value indicating a time at which a replica is created or modified. Also, timestamp 530 indicates a change of a replica performed on a server. It should be understood that any other method indicating when a replica is created or modified may be used, such as by unique sequence numbers.

Figure 6:
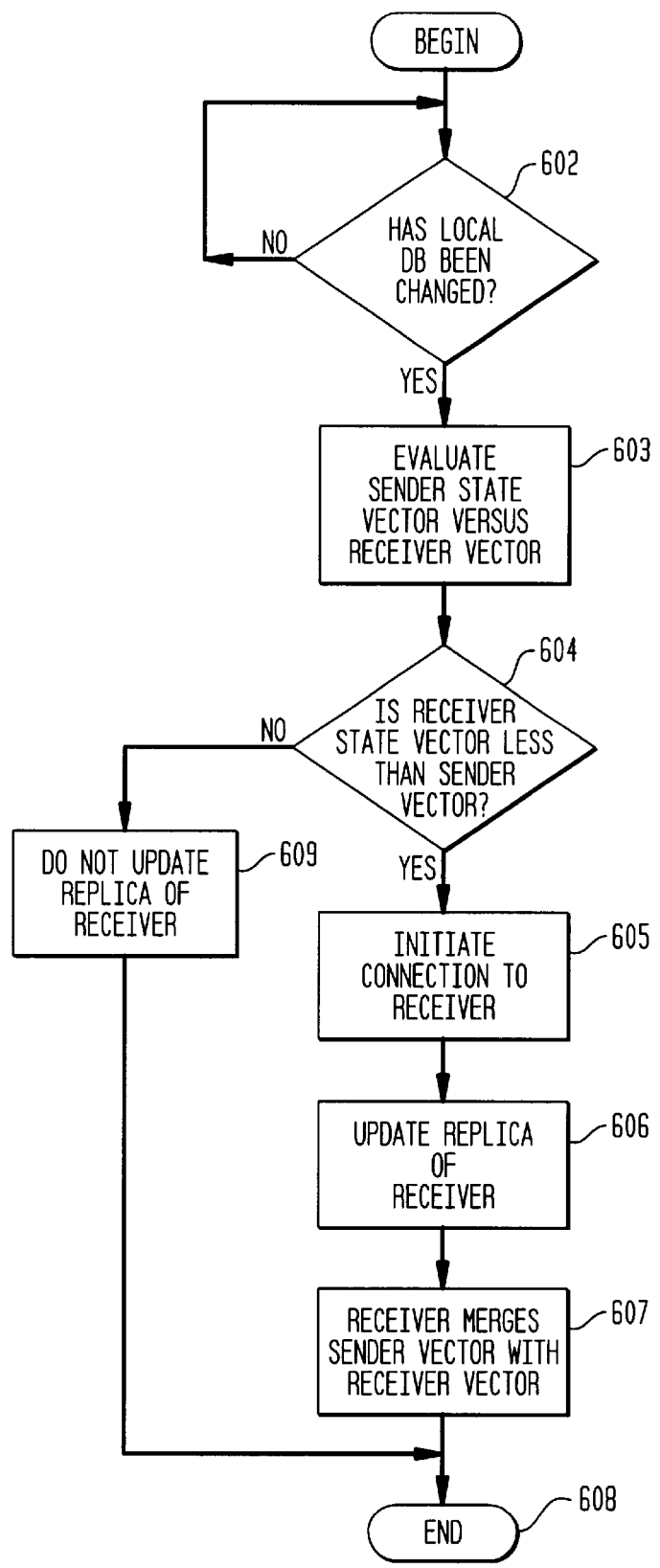
FIG. 6 is a flow chart describing one embodiment of a process for synchronizing a distributed database.

Referring now to FIG. 6, a process for synchronizing replicas is described. At block 601, the synchronization process begins. In NDS, the synchronization process may begin as a result of an event being generated by an NDS database management program. For instance, when a local replica is modified, events are generated by the network management program. The synchronization may also be performed based on policies, such as once every fifteen minutes, hour, day, etc.

At block 602, synchronization system 113 determines whether the local database replica has been changed. If so, system 113 evaluates the state vector of the sending synchronization system (with the system that provided the replica change which may or may not be synchronization system 113) versus the state vector of the receiver system (the system to receive the database update). For example, the sender synchronization system compares its own state vector TVi with TVj. If the value of TVi is greater than TVj, that server i has more current data than server j and therefore its synchronization system sends updates to server j. If not, the sender synchronization system does not update the replica of the receiver at block 609, and the synchronization process ends at block 608. However, if TVi is greater than TVj, synchronization system 113 on server i initiates a connection to a receiver synchronization system on the receiver at block 605. At block 606, the receiver synchronization system updates its replica to reflect the change in the sender replica. At block 607, the receiver synchronization system merges a sender state vector with the receiver state vector. The process of merging state vector will be discussed below with respect to FIG. 8.

Figure 7:
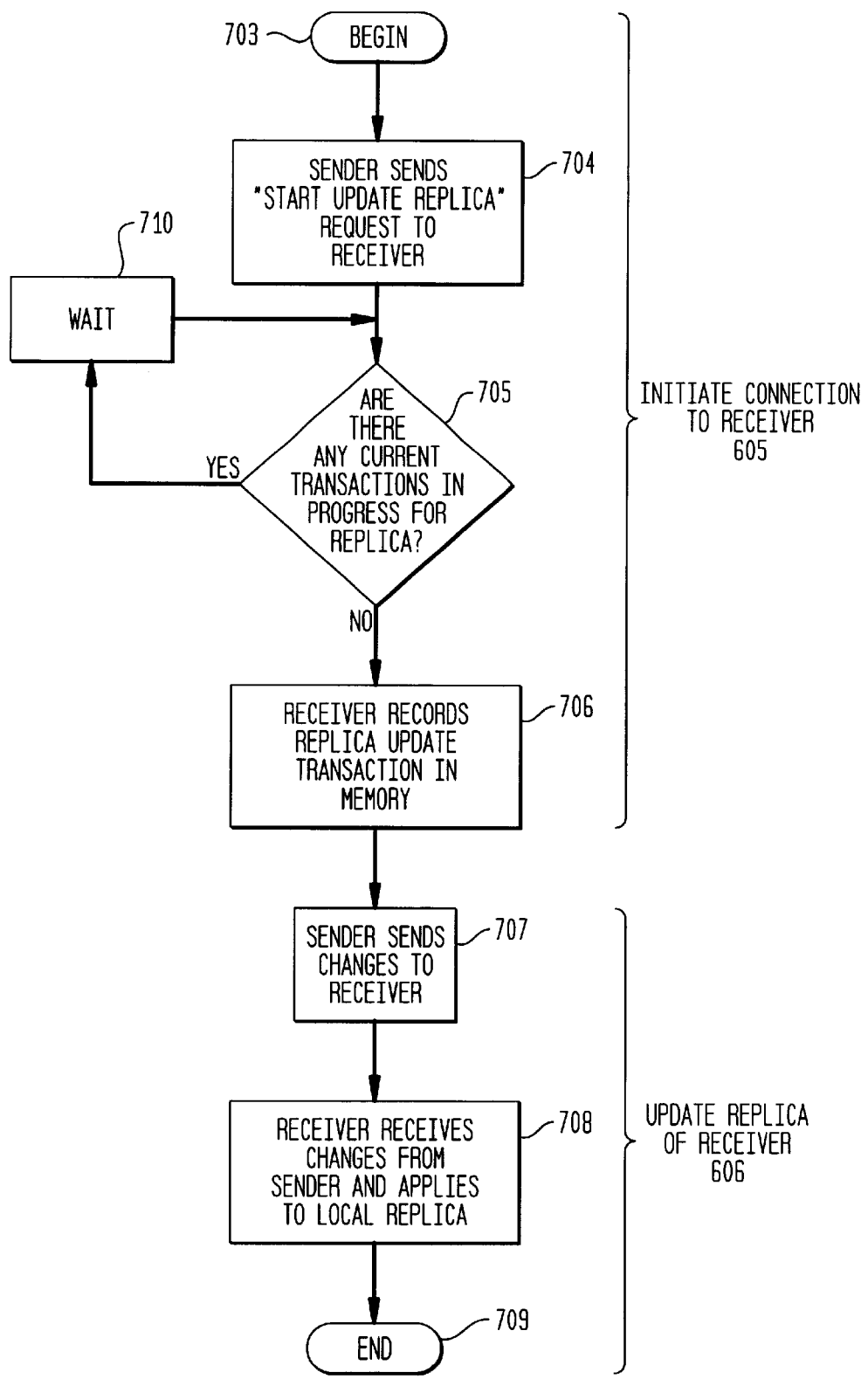
FIG. 7 is a flow chart describing one embodiment of a process for updating a distributed database and merging a state vector.

FIG. 7 shows a more detailed process of initiating a connection to a receiver and updating a replica of the receiver in accordance with one embodiment of the present invention. At block 703, the process begins. At block 704, the sender server synchronization system sends a "start update replica" request to the receiver synchronization system, which is a request to the receiver synchronization system to start a replica update. At block 705, the receiver synchronization system determines whether there are any current transactions in progress for the replica to be updated. If there is a current transaction executing, the sender synchronization system will wait at block 710. The sender synchronization system may return an error message to the sender synchronization system causing the sender system to retry after a random or preset interval of time. The receiving server synchronization system may also send a corresponding wait request to the sender server synchronization system.

If no current transactions are in progress, the receiver synchronization system records the replica update in memory to record that a replica update transactions has begun. At block 707, the sender server synchronization system sends changes to the receiver server synchronization system, and the receiver synchronization system applies the changes to the local replica at block 708. At block 709, the process ends.

Figure 8:
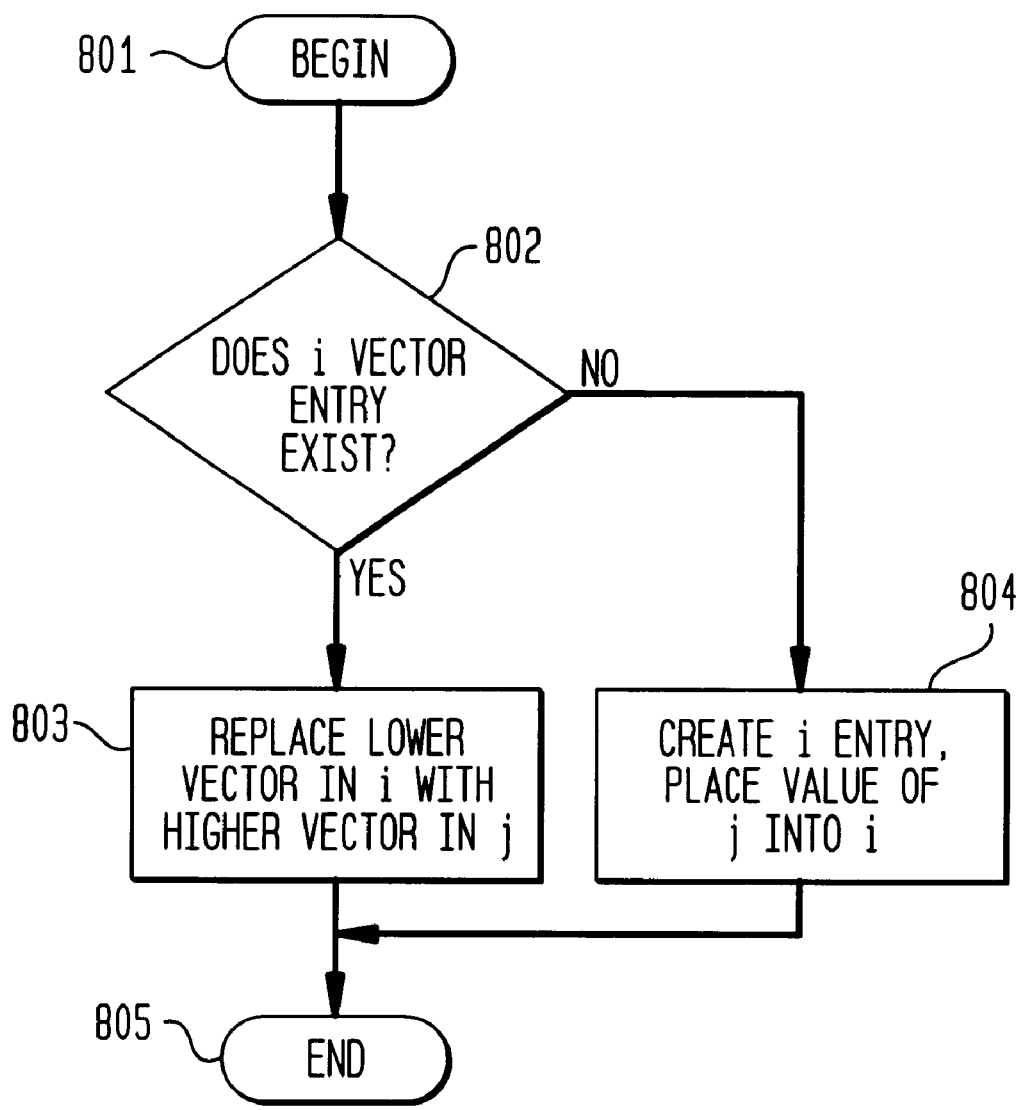
FIG. 8 is a flow chart describing one embodiment of a process for merging a state vector.

FIG. 8 shows a process for merging a state vector in accordance with one embodiment of the present invention. At block 801, the merge process begins. At block 802, the synchronization system on the receiver determines whether a vector for the i replica exists. If so, the receiver synchronization system replaces a lower value timestamp in vector TVi with the higher value timestamp in vector TVj. For example, referring to FIG. 5A, the synchronization system of server 2 will replace a lower value of timestamp in vector TV1 with a higher vector in TV2. If vector entry i does not exist, the synchronization system of server 2 creates an i entry and places the value of the j vector into i at block 804. At block 805, the merge process ends.

A server j's synchronization system can now send changes received from server i to other servers' synchronization system. These changes could be send simultaneously with server i sending changes to other servers as well. For example, if server j sends data to server m, then server m will contain a new value of TVj and TVi as a result. Therefore, as part of receiving database changes, each server also receives information about how current other replicas in the replica set are. Advantageously, servers' synchronization systems that do not communicate directly with each other will also get information from devices with which they cannot communicate.

A server may determine that is cannot communicate directly by one or more communication failures. Alternatively, it may be known a priori that communication is prohibited, and a network administrator may set a configuration policy in the server that prohibits communication to one or more servers. Further, communication may be prohibited depending on the time of day or other configuration policy.

For example, referring to FIG. 5A, in one embodiment of the present invention, server 1 cannot directly communicate with server 3. Server 2 sends data to server 3. This data includes a new TV1 (with a new TS1) and a new TV3 (with a new TS2). The synchronization system of server 3 merges the local copy of TV3 with the received TV2 and saves TV3 with a new value of TS3. Server 3 sends data to server 2. This data will include a new TV3 (with a new TS3). Server 2 then sends data to server 1. TS3 on server 2 is greater than TS3 on server 1 which implies TV2 (on server 2) is greater than TV1 (on server 2). Server 1 receives data from server 2. This data includes a new TV3. Server 1 merges its local copy of TV1 with TV2 received from server 2. Server 1 now "knows" or recognizes that server 3 has seen its original change without having to contact server 3 directly.

A partitioning operation can be performed using the synchronization framework described above with reference to FIG. 5A. In particular, a partitioning operation may transmit partition changes as replica changes in the same manner to effect a partitioning operation. An advantage of using the previously described synchronization framework allows partition operations to be completed without requiring the master replica to contact all other replicas in the replica set.

Partition operations are performed as a result of state transitions. These transitions are synchronized similar to replica changes as described above. When a server having a replica of a partition receives a transition specifying a particular partition operation, the server performs that operation. The master server having the master replica controls the transitions, but the master is not responsible for notifying all replica servers of the transition directly. These transitions are communicated using the above-described synchronization process as regular data and the burden of synchronizing partition changes is shared by all of the replicas. In one embodiment, partition changes are propagated to other servers by transmitting a replica pointer.

A replica pointer 540 of FIG. 5A contains information about a replica in a replica set. The following information is kept in the replica pointer:

a) Server name: Name of server hosting the replica
b) Replica type: One of master, read-write, read-only, subordinate reference
c) Replica state: One of RS__BEGIN__ADD, RS__NEW__REPLICA, RS__ON, RS__DYING, RS__DEAD, etc. wherein the RS__ADD state indicates that a request for adding a replica has been accepted by the master, the RS__NEW__REPLICA state indicates that the replica is now ready to be populated with database information, and the RS__ON state indicates that the replica has been turned on by the master and now can provide suitable client services. The RS__DYING state indicates that the replica is going to be inoperable at some point in the future. The RS__DEAD state indicates that the replica is "dead," i.e. in operable, and the replica will not accept database updates.
d) Server address: A cache of the server network address hosting the replica A replica pointer set includes a set of replica pointers. Each replica pointer is stored as a value in memory of each server and includes its own time stamp information. The replica pointer is treated by the synchronization system as regular data (similar to replica change data) and is transmitted between servers. A server 101–103 may store replica pointers of other servers in a similar manner as a state vector is stored. For example, replica pointers 540A–C may be stored at each server, and "perceived" replica pointers of other servers may also be stored. This pointer information may be used to track states of servers as perceived by a particular server.

Figure 9:
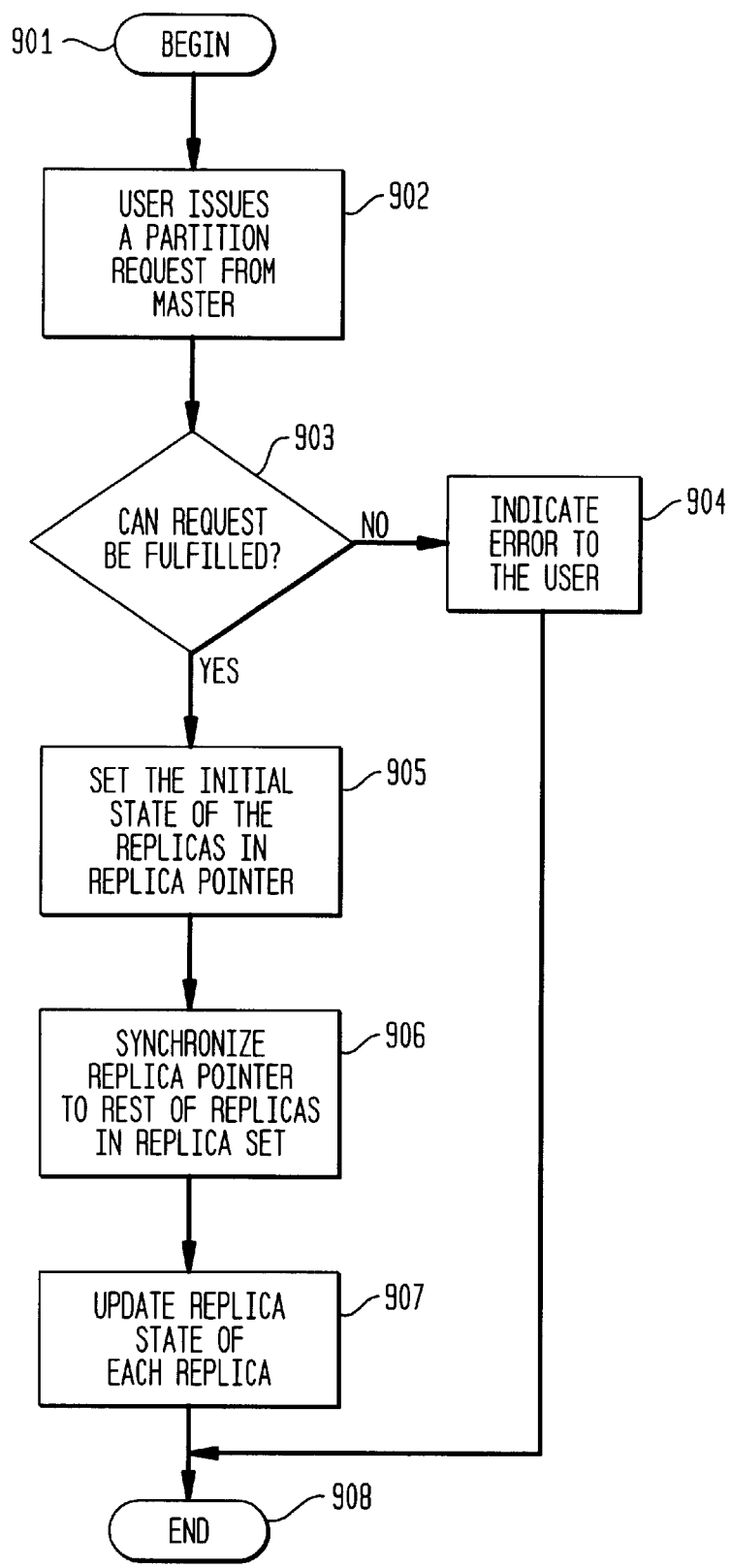
FIG. 9 is a flow chart describing one embodiment of a process for partitioning a distributed database.
Figure 10A:
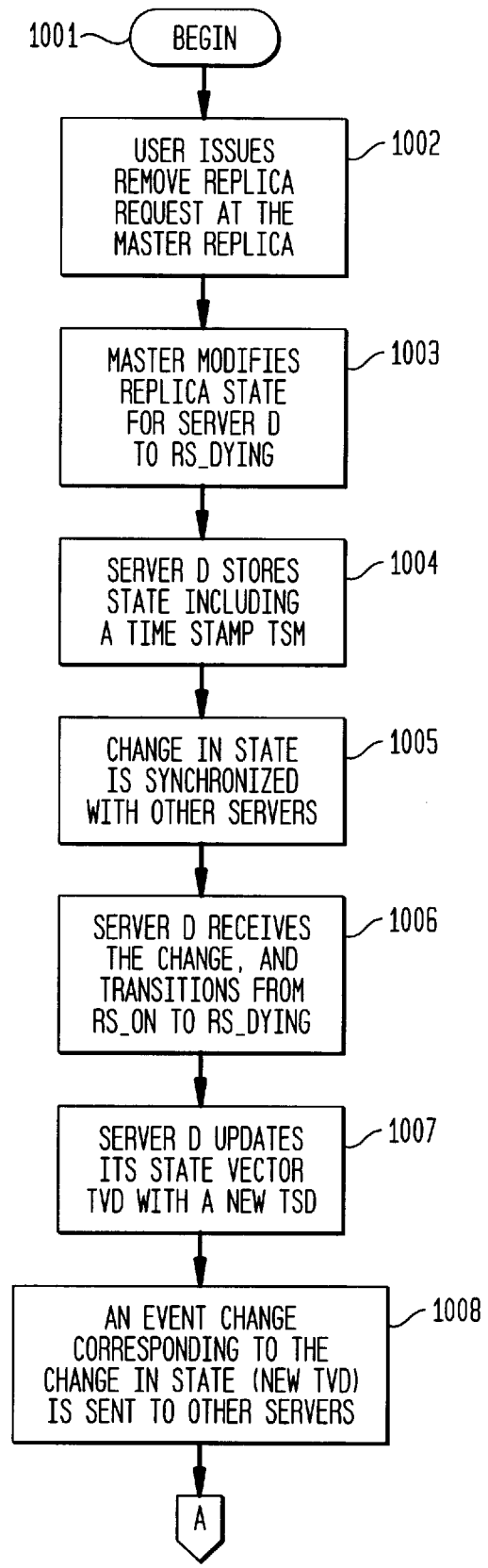
FIGS. 10A–D are flow charts describing one embodiment of a process for deleting a replica of a distributed database.
Figure 10B:
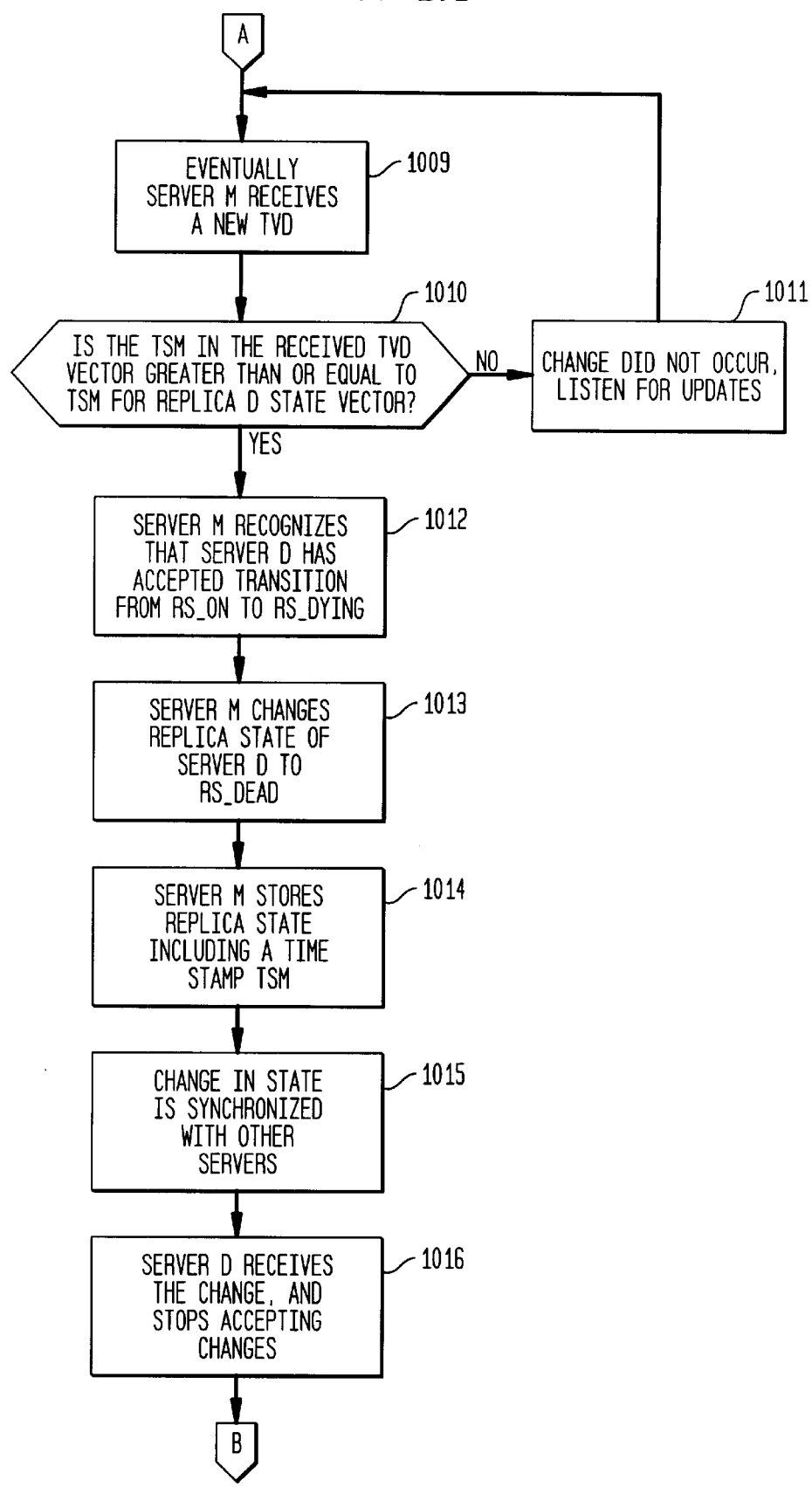
Figure 10C:
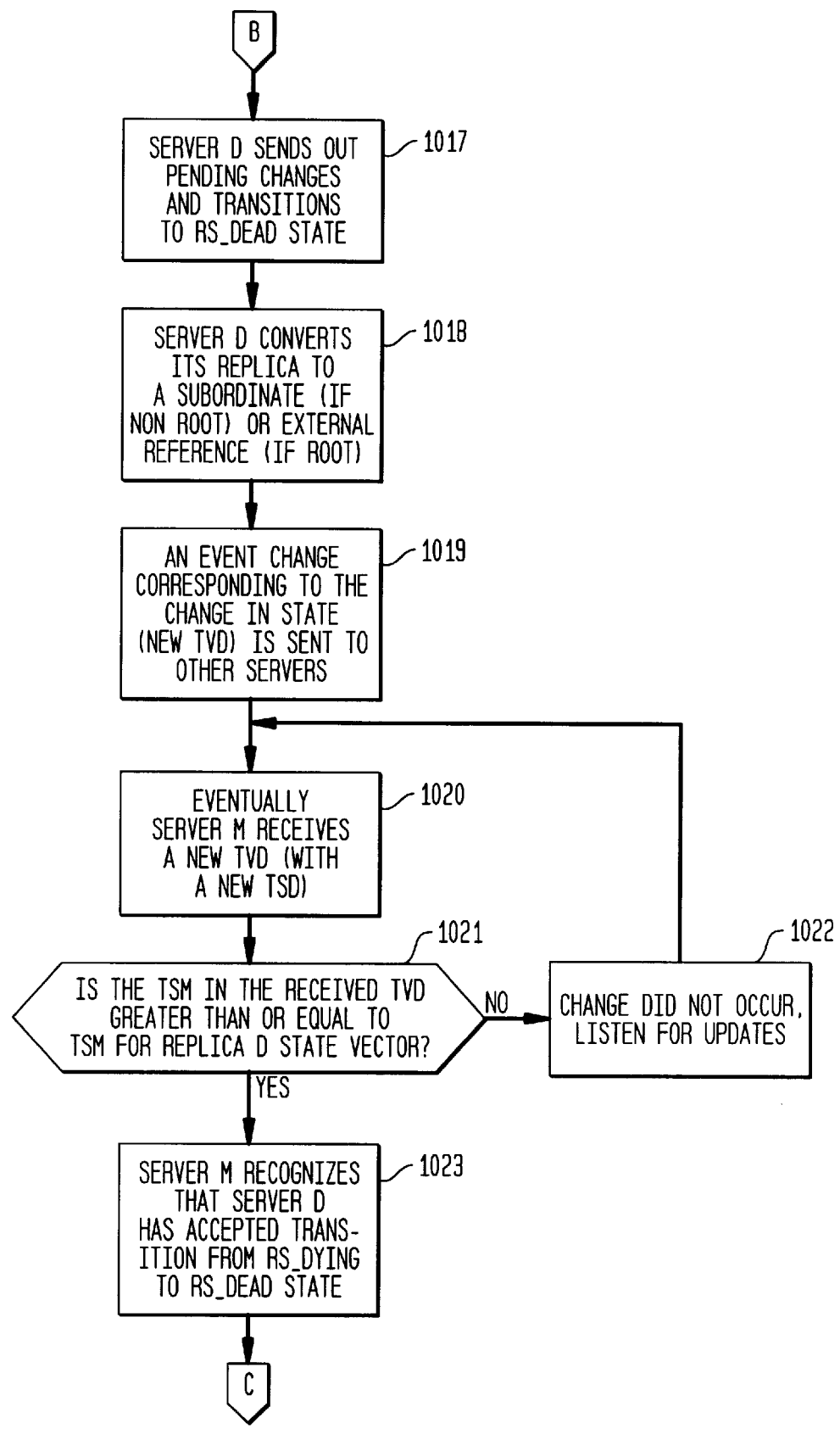
Figure 10D:
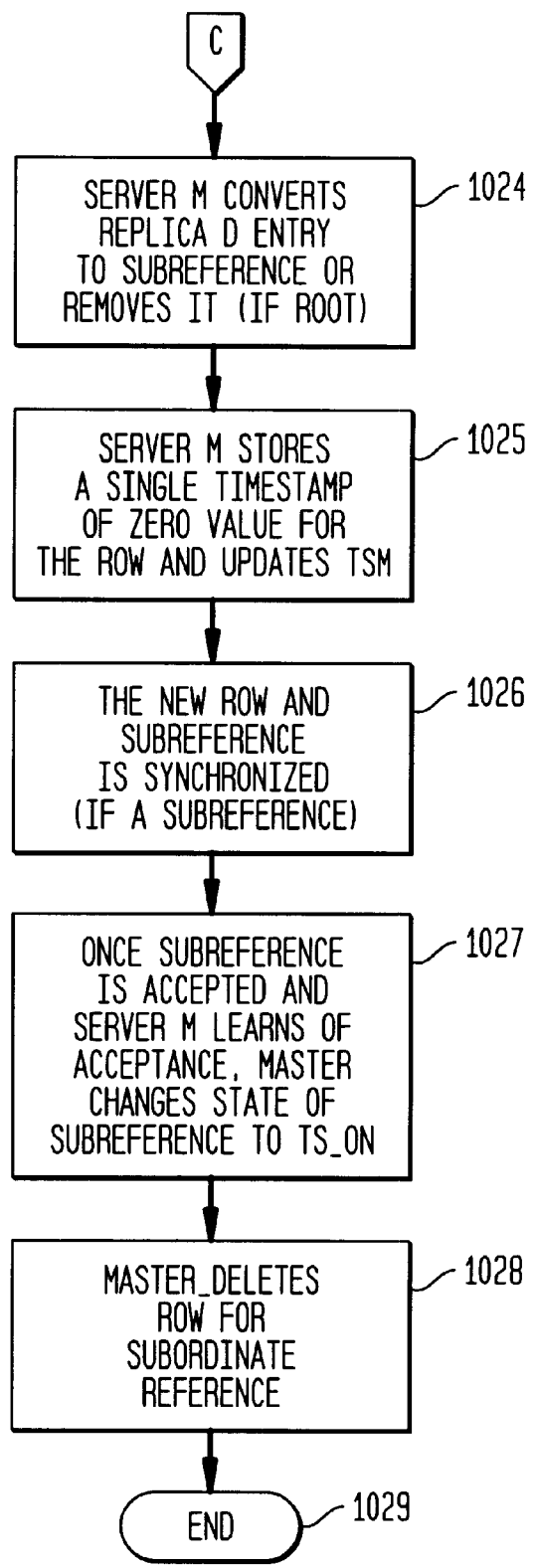

In one embodiment, partition operations may utilize synchronization system 109 to transfer partition changes. FIG. 9 shows a process of synchronizing partition changes among a group of replicas. At block 901, the synchronization process begins. At block 902, the user issues a partition request. The user may, for example, operate a network management program (such as the Nwadmin, Console One or NDS Manager network management programs available from Novell, Inc.) to issue the request. The request is typically served by the master server having the master replica. At block 903, the master server determines whether the request for partition can be fulfilled (performed). The master replica in some instances may not be available, and no partitioning operations can be performed. For instance, the master may be busy. If the request cannot be fulfilled, a message is sent to the user at the network management or administrative station indicating that the partition operation cannot be performed.

If the operation can be performed, the master server sets the initial state of the replicas in the local copy of the replica pointer and returns a success message to the network management station at block 905. At block 906, the master server synchronizes the replica pointer with the rest of the replicas in the replica set. That is, the master server transmits the replica pointer with its replica state values to other replicas. The replicas each update their states according to the received replica pointer values. If, for example, a particular server could not communicate directly with the master server, that particular server may receive the updated replica pointer from an intermediate server. The master advances the replica state until the partition operation has completed, that is, the partition changes have propagated to all replicas. Once the operation completes, the master server sets the state of each of the replicas to the RS__ON state at block 908.

FIGS. 10A–D show a process of deleting a replica from a replica set. The master will be referred to as server M, and in this embodiment, is the location at which partition changes are effected. Server D is a server having a replica of a partition that is to be deleted. At block 1001, the deletion process begins. At block 1002, a user such as a network administrator issues a remove request at the master (server M) having the master replica. The master modifies a replica state for server D to RS_DYING, a state indicating that the replica is "dying" or will become non-functional at some point in the future at block 1003.

At block 1004, server M stores the state RS_DYING of server D including a time stamp TSM. The change in state of server D is transmitted to one or more intermediate servers in the network at block 1005. At least one of the intermediate servers that communicates with server D transmits the change in state of server D to server D, and server D transitions from the RS_ON state to the RS_DYING state at block 1006. At block 1007, server D updates its own state vector TVD with a new value of TSD. Server D sends an event change corresponding to the change in state of server D to the intermediate servers at block 1008.

Eventually, server M receives a new TVD from the intermediate servers at block 1009. At block 1010, server M inspects the value of TSM in the received TVD vector. If the value of TSM is greater than or equal to TSM for the replica D state vector, server M recognizes that server D has accepted a transition from RS_ON to RS_DYING at block 1012. If not, server M recognizes that the change did not occur, and server M continues to listen for updates of TVD at block 1011. At block 1013, server M changes the replica state of server D on server M to RS_DEAD.

At block 1014, server M stores the replica state of the D server including a timestamp TSM. At block 1015, the change in state is synchronized with intermediate servers as discussed above. Server D receives the change in state at block 1016, and stops accepting further database changes for the replica to be deleted. At block 1017, server D sends out pending changes for the replica to be deleted and transitions to the RS_DEAD state after all pending changes have been sent out. Server D then converts its replica to a subordinate reference (if the deleted replica was a non-root partition) or converts its replica to an external reference (if the deleted replica was a root partition replica). At block 1019, server D sends an event change corresponding to the change in state (and sends a new TVD) to the intermediate servers.

At block 1020, server M eventually receives a new value of TVD (with a new TSD) from at least one of the intermediate servers. If, at block 1021, server M determines that the value of TSM in the received TVD is greater than or equal to the value of TSM for the replica D state vector (the value of TSM stored in TVD on server M), then server M recognizes that server D has accepted transition from the RS_DYING state to the RS_DEAD state. If not, server M notes that the change in state of server D did not occur, and server M listens for further updates of TVD at block 1022.

At block 1024, server M converts replica D entry to a subreference or removes it entirely (if the replica was a replica of the root partition). At block 1025, server M stores a single timestamp of zero value for the row and updates server M's copy of TSM. At block 1026, a new row and subreference is synchronized, if a subordinate reference was created at block 1018. Once a subordinate reference is accepted and server M learns of acceptance, server M changes the state of subordinate reference to RS_ON at block 1027. At block 1028, server M deletes the row for the subordinate reference. At block 1029, the deletion process ends.

While various embodiments of the present invention have been described above, it should be understood that they have been presented by way of example only, and not limitation. For instance, other partitioning operations may be performed using synchronization systems and methods described herein, including joining, splitting, and moving partitions. Thus, the breadth and scope of the present invention are not limited by any of the above exemplary embodiments, but are defined only in accordance with the following claims and their equivalents.

What is claimed is:

1. A method for synchronizing replicas of at least a portion of a database, wherein each of the replicas is associated with a respective node and is further associated with a respective known state vector comprising information regarding a state of synchronization of that replica and a state of synchronization of the other replicas as perceived by that replica, and wherein each of the replicas is also associated with perceived state vectors, each of the perceived state vectors corresponding to a respective other one of the replicas and comprising information regarding a state of synchronization of the replica to which it is associated as perceived by the respective other one of the replicas, wherein a node associated with a replica receives a perceived state vector from a node associated with the other one of the replicas to which the perceived state vector corresponds, the method comprising:

comparing a known state vector associated with a first one of the replicas with perceived state vectors associated with the first one of the replicas to determine if the first one of the replicas includes a change that should be made to one of the other replicas;

if the change should be made to the one of the other replicas, sending the change and the known state vector associated with the first one of the replicas to a node associated with the one of the other replicas to which the change should be made;

making the change to the one of the other replicas to which the change should be made;

updating information regarding a state of synchronization in a known state vector associated with the one of the other replicas to which the change was made; and storing the known state vector associated with the first one of the replicas in a perceived state vector corresponding to the first one of the replicas and associated with the one of the other replicas to which the change was made, wherein a perceived state vector associated with the one of the other replicas to which the change was made and corresponding to a respective one of the other replicas comprises information regarding a state of synchronization of the one of the other replicas to which the change was made, as perceived by the respective one of the other replicas, and wherein the known state vector associated with the one of the other replicas to which the change was made can be compared with the perceived state vector associated with the one of the other replicas to which the change was made to determine if the one of the other replicas to which the change was made includes a change that should be made to one of the replicas.

2. The method according to claim 1, further comprising:

in response to the act of making the change included in the first one of the replicas to the one of the other replicas to which the change should be made, comparing the known state vector associated with the one of the other replicas to which the change was made with the perceived state vectors associated with the one of the other replicas to which the change was made to determine if the one of the other replicas to which the change was made includes a change that should be made to one of the replicas.

3. The method according to claim 1, wherein the act of comparing is in response to a change made to the first one of the replicas.

4. The method according to claim 1, wherein the act of comparing is performed in accordance with a policy.

5. The method according to claim 1, wherein the act of comparing is performed at a node associated with the first one of the replicas, and the acts of updating and storing are performed at the node associated with the one of the other replicas to which the change was made.

6. The method according to claim 1, wherein each of the state vectors comprises a plurality of unique identifiers, each of which being associated with a particular one of the replicas.

7. The method according to claim 1, wherein each of the state vectors comprises a plurality of timestamps.

8. The method according to claim 7, further comprising, in response to a change to one of the replicas, updating one of the timestamps in one of the known state vectors.

9. The method according to claim 7, wherein the act of comparing comprises comparing a timestamp in the known state vector associated with the first one of the replicas with a timestamp in the perceived state vectors associated with the first one of the replicas.

10. The method according to claim 1, wherein the act of updating information further comprises merging the known state vector associated with the first one of the replicas with the known state vector associated with the one of the other replicas to which the change was made.

11. The method according to claim 1, wherein the replicas each belong to a replica set.

12. The method according to claim 11, wherein each known state vector comprises information regarding a state of synchronization of its associated one of the replicas in the replica set and information regarding a state of synchronization of each of the other ones of the replicas in the replica set that are currently receiving updates.

13. The method according to claim 11, wherein each known state vector comprises information regarding a state of synchronization of its associated one of the replicas in the replica set and information regarding a state of synchronization of each of the other ones of the replicas in the replica set that are read/write replicas.

14. The method according to claim 1, wherein the change comprise a partition change.

15. A system for synchronizing replicas of at least a portion of a database, comprising:
   a known state vector associated with each one of the replicas, each of the known state vectors comprising information regarding a state of synchronization of the associated one of the replicas and states of synchronization of other ones of the replicas as perceived by the associated one of the replicas;
   perceived state vectors associated with each one of the replicas, wherein each of the perceived state vectors is associated with one of the replicas and corresponds to a respective other one of the replicas and comprises information regarding a state of synchronization of the one of the replicas to which it is associated as perceived by the respective other one of the replicas;
   executable instructions operable to compare the known state vector associated with a first one of the replicas with perceived state vectors associated with the first one of the replicas to determine if the first one of the replicas includes a change that should be made to one of the other replicas;
   executable instructions operable to send the change and the known state vector for the first one of the replicas to a node associated with the one of the other replicas if the change should be made to the one of the other replicas;
   executable instructions operable to make the change to the one of the other replicas to which the change should be made;
   executable instructions operable to update information regarding a state of synchronization in a known state vector associated with the one of the other replicas to which the change was made; and
   executable instructions operable to store the known state vector for the first one of the replicas in a perceived state vector corresponding to the first one of the replicas and associated with the one of the other replicas to which the change was made,
   wherein a perceived state vector associated with the one of the other replicas to which the change was made and corresponding to a respective one of the other replicas comprises information regarding a state of synchronization of the one of the other replicas to which the change was made, as perceived by the respective one of the other replicas, and wherein the known state vector associated with the one of the other replicas to which the change was made can be compared with the perceived state vector associated with the one of the other replicas to which the change was made to determine if the one of the other replicas to which the change was made includes a change that should be made to one of the replicas.

16. An apparatus capable of synchronizing replicas of at least a portion of a database, comprising:
   a processor;
   a memory system configured to store the replicas, wherein each of the replicas is associated with a known state vector comprising information regarding a state of synchronization of that replica and a state of synchronization of the other replicas as perceived by that replica, and wherein each of the replicas is also associated with perceived state vectors, each of the perceived state vectors corresponding to a respective other one of the replicas and comprising information regarding a state of synchronization of the replica to which it is associated as perceived by the respective other one of the replicas; and
   a synchronization system configured to:
      compare a known state vector associated with a first one of the replicas with perceived state vectors associated with the first one of the replicas to determine if the first one of the replicas includes a change that should be made to one of the other replicas;
      send the change and the known state vector associated with the first one of the replicas to a node associated with the one of the other replicas if the change should be made to the one of the other replicas;
      make the change to the one of the other replicas to which the change should be made;
      update information regarding a state of synchronization in a known state vector associated with the one of the other replicas to which the change was made; and
      store the known state vector associated with the first one of the replicas in a perceived state vector corresponding to the first one of the replicas and associated with the one of the replicas to which the change was made, wherein a perceived state vector associated with the one of the other replicas to which the change was made and corresponding to a respective one of the other replicas comprises information regarding a state of synchronization of the one of the other replicas to which the change was made, as perceived by the respective one of the other replicas, and wherein the known state vector associated with the one of the other replicas to which the change was made can be compared with the perceived state vector associated with the one of the other replicas to which the change was made to determine if the one of the other replicas to which the change was made includes a change that should be made to one of the replicas.

17. A state matrix for use in synchronizing replicas of at least a portion of a database, comprising:

a known state vector associated with a first one of the replicas and comprising information regarding a state of synchronization of the first one of the replicas and states of synchronization of the other ones of the replicas as perceived by the first one of the replicas; and perceived state vectors associated with the first one of the replicas, each of which perceived state vectors corresponding to a respective other one of the replicas and comprising information regarding a state of synchronization of the first one of the replicas as perceived by the respective other one of the replicas, wherein the known state vector can be compared with the perceived state vectors to determine if the first one of the replicas includes a change that should be made to one of the other replicas;

if the change should be made to the one of the other replicas, the change and the known state vector can be sent to a node associated with the one of the other replicas;

the change to the one of the other replicas can be made;

information regarding a state of synchronization of the one of the other replicas to which the change was made can be updated in a known state vector of a state matrix associated with the one of the other replicas to which the change was made; and the known state vector associated with the first one of the replicas can be stored in a perceived state vector corresponding to the first one of the replicas in the state matrix associated with the one of the other replicas to which the change was made, wherein a perceived state vector of the state matrix associated with the one of the other replicas to which the change was made and corresponding to a respective one of the other replicas comprises information regarding a state of synchronization of the one of the other replicas to which the change was made, as perceived by the respective one of the other replicas, and wherein the known state vector of the state matrix associated with the one of the other replicas to which the change was made can be compared with the perceived state vector of the state matrix associated with the one of the other replicas to which the change was made to determine if the one of the other replicas to which the change was made includes a change that should be made to one of the replicas.

18. Computer readable medium comprising instructions for performing a method for synchronizing replicas of at least a portion of a database, wherein each of the replicas is associated with a known state vector comprising information regarding a state of synchronization of that replica and a state of synchronization of the other replicas as perceived by that replica, and wherein each of the replicas is also associated with perceived state vectors, each of the perceived state vectors corresponding to a respective other one of the replicas and comprising information regarding a state of synchronization of the replica to which it is associated as perceived by the respective other one of the replicas, the method comprising:

comparing a known state vector associated with a first one of the replicas with perceived state vectors associated with the first one of the replicas to determine if the first one of the replicas includes a change that should be made to one of the other replicas;

if the change should be made to the one of the other replicas, sending the change and the known state vector associated with the first one of the replicas to a node associated with the one of the other replicas to which the change should be made;

making the change to the one of the other replicas to which the change should be made;

updating information regarding a state of synchronization in a known state vector associated with the one of the other replicas to which the change was made; and storing the known state vector associated with the first one of the replicas in a perceived state vector corresponding to the first one of the replicas and associated with the one of the other replicas to which the change was made, wherein a perceived state vector associated with the one of the other replicas to which the change was made and corresponding to a respective one of the other replicas comprises information regarding a state of synchronization of the one of the other replicas to which the change was made, as perceived by the respective one of the other replicas, and wherein the known state vector associated with the one of the other replicas to which the change was made can be compared with the perceived state vector associated with the one of the other replicas to which the change was made to determine if the one of the other replicas to which the change was made includes a change that should be made to one of the replicas.

* * * * *